United States Patent [19]

Morand et al.

[11] Patent Number: 5,061,064
[45] Date of Patent: Oct. 29, 1991

[54] DETECTOR OF THE ARRIVAL ANGLE OF LASER PULSES, ESPECIALLY FOR TANKS

[75] Inventors: Jean-François Morand; Henri Robin; Jacques Thibault, all of Saint Cloud, France

[73] Assignee: Electronique Serge Dassault, Saint Cloud, France

[21] Appl. No.: 218,081

[22] Filed: Jun. 28, 1988

[30] Foreign Application Priority Data

Jul. 2, 1987 [FR] France ............................. 87 09412

[51] Int. Cl.⁵ .......................... G01C 1/00; H01J 5/16
[52] U.S. Cl. .................................. 356/152; 250/216; 250/227.11; 250/227.31; 359/599
[58] Field of Search .................. 356/141, 152, 400; 250/216, 227, 237 R, 239; 350/168, 227.11, 227.28, 227.03, 227.31

[56] References Cited

U.S. PATENT DOCUMENTS

| | | | |
|---|---|---|---|
| 3,719,424 | 3/1973 | Weischedel | 356/152 |
| 4,181,398 | 1/1980 | Sick | 250/227 X |
| 4,827,120 | 5/1989 | Stauffer | 250/227 |

*Primary Examiner*—Linda J. Wallace
*Attorney, Agent, or Firm*—Herbert Dubno

[57] ABSTRACT

A detector of pulses of electromagnetic radiation, especially of laser pulses, comprising as sensor at least one cylindrical body of material translucent to the electromagnetic radiation having a capture window on its surface of revolution. The cylindrical body is provided with an internal metallization delimiting the cylindrical body in two parts subject to selective photodetection, to obtain a sensitivity in bearing and/or in elevation. The body is extended at one end by a non-diffusing transparent part, likewise traversed by the internal metallization. The extension is externally metallized and serves for the link with photodetectors.

17 Claims, 5 Drawing Sheets

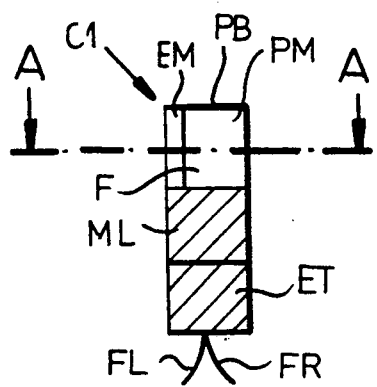
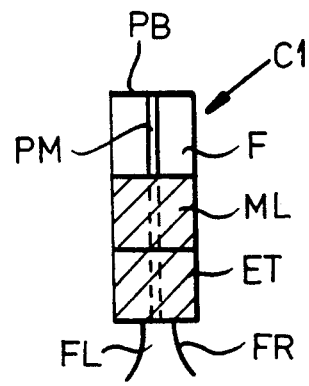
FIG.1A        FIG.1B
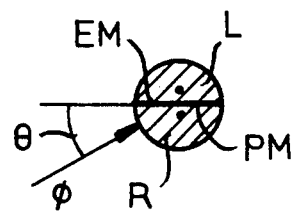
FIG.1C

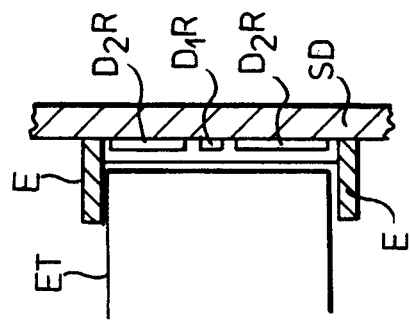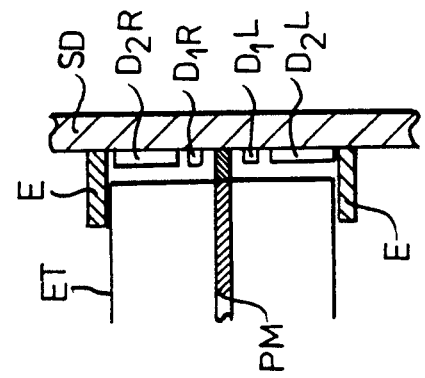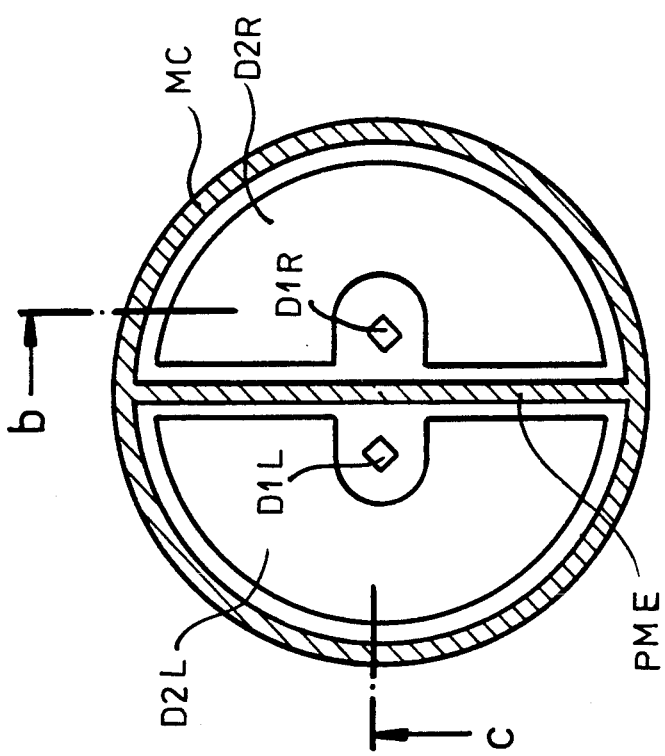

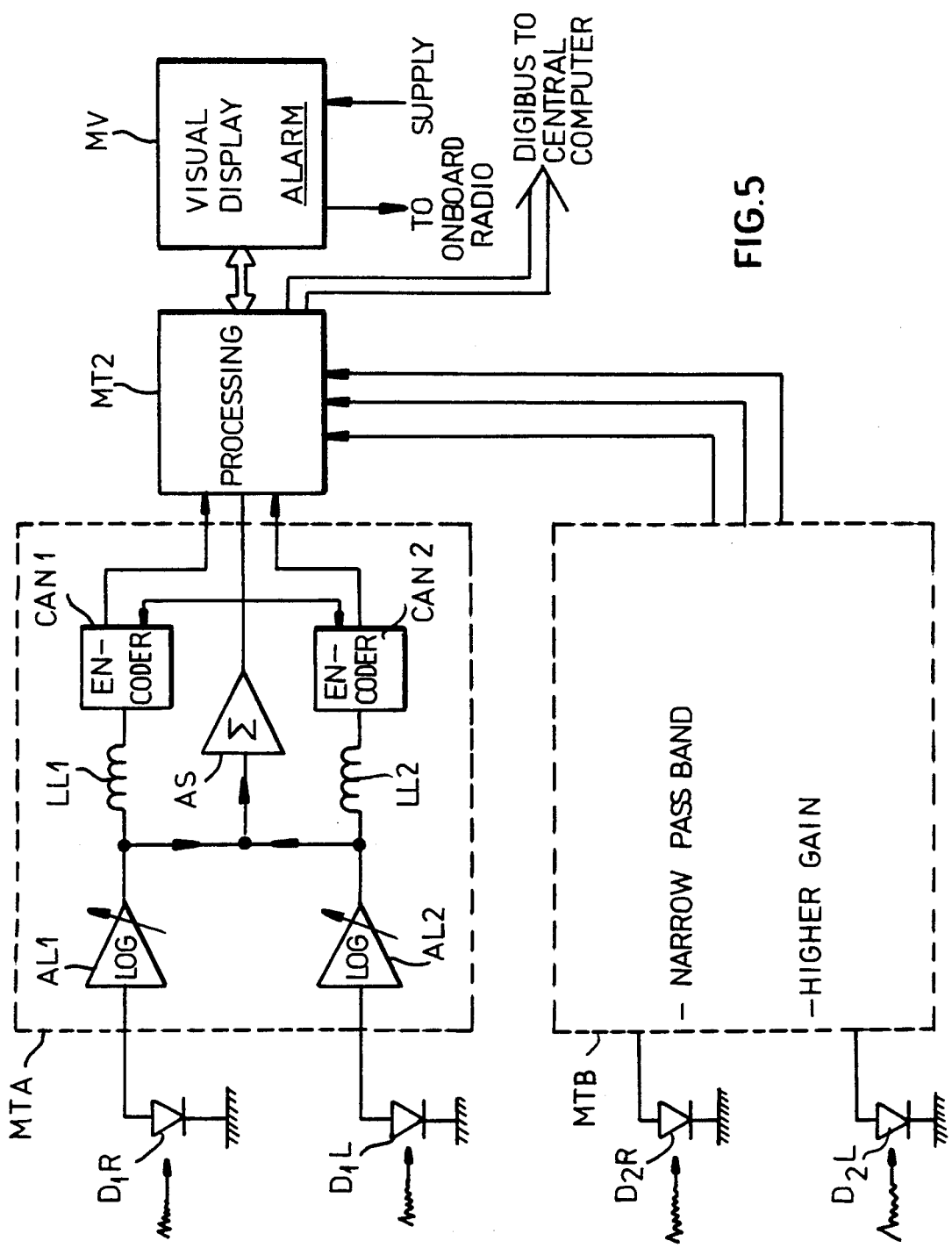

DETECTOR OF THE ARRIVAL ANGLE OF LASER PULSES, ESPECIALLY FOR TANKS

FIELD OF THE INVENTION

The invention relates to the detection of the arrival of laser pulses.

PRIOR ART

Commonly assigned patent application Ser. No. 07/148,773 filed Dec. 21, 1987 describes the principle of a detector of pulses of electromagnetic radiation, especially laser pulses comprising sensing means, sensitive to the orientation of the incident beam in bearing and/or in elevation, and connected to photodetector means. The sensing means comprise at least one body of revolution, such as a cylinder, of a material which is transparent to, and spatially diffusing for, the electromagnetic radiation. This body possesses a capture window on its surface of revolution, and is arranged to possess an angular sensitivity in bearing and/or in elevation. This angular sensitivity can be obtained by an internal metallization of the body of revolution.

Such detectors may be useful on vehicles, such as tanks where the available resources regarding space, weight and financing are limited, while the precision required for the angular detection is not very great.

OBJECTS OF THE INVENTION

It is one object of the present invention to improve the aforementioned devices, particularly for the purpose of adapting them to these latter constraints, in order to provide detectors of a precision which is clearly better than that currently available on vehicles.

It is a further object of the invention to provide a detector permitting a rapid angular display in terms of bearing according to sectors of approximately 15° over an observed zone of ±60° in bearing and ±30° in elevation.

Another object of the invention is to provide a detector which is compact and which can be mounted outside a vehicle, without requiring links by optical fibres.

A still further object of the invention is to permit a detection and a display which are selective, for different types of incident laser pulses.

A yet further object of the invention is to permit the use of simplified electronic processing circuits.

SUMMARY OF THE INVENTION

The present invention provides a detector of pulses of electromagnetic radiation, for use with photodetector means, comprising sensing means which include at least one body of revolution having first and second ends and formed of material which is transparent to, and spatially diffusing for, the electromagnetic radiation, said body of revolution having a capture window on its surface of revolution and being provided with an internal metallization delimiting on the body of revolution two parts subject to selective photodetection in order to obtain a sensitivity in bearing and/or in elevation, there being a non-diffusing transparent part of said body extending it at said first end, said non-diffusing transparent part being traversed by said internal metallization and being externally metallized for serving as the link with said photodetector means.

Such non-diffusing transparent extension exhibits the advantage of providing a simple means for constructing an optical bend, which readily permits the installation of the device outside a vehicle in an observation position.

At least one photoelectric transducer may be mounted on the free end of the said non-diffusing transparent extension, to each side of the internal metallization.

Very advantageously, two photodetectors or two groups of photodetectors are provided on each side. This permits, on the one hand, a rapid photodetection for short and powerful pulses and, on the other hand, a more sensitive photodetection of the signals of slower modulation for which it is possible to use a narrower electrical amplification frequency band.

Advantageously, the rapid photodetector or photodetectors are mounted on a small surface close to the axis of the said extension; for their part the sensitive photodetector or photodetectors cover the major part of the remainder of the surface available at the free end of the extension, on each side of the metallized plane.

In a further development of the invention, the internal metallization plane is modified so that, at the location of the capture window, the metallization terminates on one side, at a distance from the surface of the body of revolution. Preferably, the edge of this termination is parallel to a generatrix of the surface of the body of revolution (the generatrix forming part of the plane of the metallization). This provides a partial common mode reducing the ratio of the optical powers received in the two parts of the body, and then permitting the linearization of the response of the detecting device.

According to a further aspect of the invention, the device includes, for each type of photodetector, first processing means comprising:

two logarithmic amplifiers receiving the signals emanating from the two parts of the body respectively;

an integrating amplifier of the outputs of the two logarithmic amplifiers;

two delay elements connected to the outputs of the two logarithmic amplifiers respectively, and two analogue-digital encoders respectively connected to the outputs of the two delay elements and triggered as a function of the output of the integrating amplifier.

Then, the device of the invention advantageously includes second processing means receiving the outputs of the encoders and of the integrating amplifier, to determine the ratio between the optical powers received in the two parts of the body.

According to a further aspect of the invention, the device comprises visual display means defined by a row of photodiodes in a circular arc representing angular sectors about a reference value, for example the axis of displacement of a vehicle, with a digital display of a finer angular measurement and with the indication of the type of incident signal received by the photodetectors. This visual display may be supplemented by an audible alarm.

Finally, the device of the invention may be enclosed within a casing which is armoured except on the sensitive side of the body of revolution where the casing is closed by an inclined shield.

BRIEF DESCRIPTION OF THE DRAWING

Further features and advantages of the invention will become evident on examining the detailed description which follows, and the accompanying drawing in which:

FIGS. 1A to 1C illustrate a first embodiment of a sensor for the device according to the invention;

FIGS. 4A, 4B, 4C illustrate the direct mounting of photodetectors at the base of the sensor according to the invention;

FIG. 5 illustrates, in the form of a block diagram, the electronic part of the detector according to the invention;

DESCRIPTION OF THE PREFERRED EMBODIMENT

The present invention makes use of features, especially geometric ones, which are difficult to represent otherwise than by a drawing. Consequently, the accompanying drawing will be able to serve not only to provide a better understanding of the description, but also to define the invention, as appropriate.

FIG. 1 shows a device comparable with that disclosed in the aforementioned Application.

The sensor C1 of FIG. 1 includes a cylindrical body provided at the top with an end metallization plane (PB), below which there is defined a window F to capture the pulses of incident electromagnetic radiation. Immediately below, the body C1 is laterally metallized as indicated at ML.

Within this part ML which is adjacent to the window the body is internally translucent to, that is to say transparent to but spatially diffusing for, the electromagnetic radiation.

One of the aspects of the present invention consists in further providing an extension ET, likewise surrounded by the external metallization ML, but purely transparent to, i.e. not spatially diffusing for, the electromagnetic radiation.

It has been observed that this extension ET provides an easy optical adaptation for the recovery of the signals received in the two parts of the sensor, that is to say on each side of the metallized plane PM. It is for example possible to connect optical fibres FL and FR, respectively, for this purpose in the left-hand and right-hand parts of the sensor.

Figure 3A:
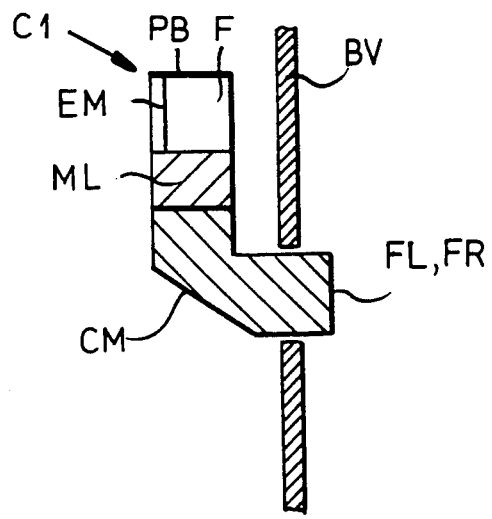
FIGS. 3A and 3B illustrate a second embodiment of a sensor according to the invention.
Figure 3B:
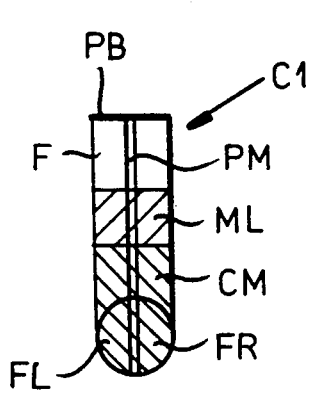

FIGS. 3A and 3B illustrate a modified embodiment in which the extension ET is constructed in the form of a metallized optical bend CM. In this case the expression "optical bend" signifies that the bend is arranged to permit the transmission of the optical signals without losses, with an angular displacement which is in this case 90°. Such an angular displacement especially permits the mounting of the device outside a vehicle whose wall BV has been illustrated in FIG. 3A.

FIGS. 1 and 3 likewise show a further feature of the invention:

In these Figures, at the location of the window F the metallized plane PM does not fully traverse the internal part of the body C1. It is in fact possible to note a gap EM formed between the boundary edge of the plane PM and the external generatrix of the body C1 (see FIGS. 1A and 3A). Although it could be considered a priori as a disadvantage capable of diminishing the angular sensitivity of the sensor, this gap has on the contrary proved to show expedient advantages.

In fact, if it is assumed that the incident laser pulse is situated in the axis of the metallized plane PM it will be received equally in the two parts of the body.

If, on the other hand, the incident laser pulse impinges at an angle of 90° with respect to the metallized plane PM, then it is received in only one of the parts of the body (in the absence of the gap). One of the signals sensed is therefore very strong, while the other is virtually zero.

Now, the application of such a device assumes that a ratio exists between the signals received in the two parts of the body. Further, this ratio is advantageously formed by utilizing logarithmic amplifiers. It is clear that, if one of two logarithmic amplifiers receives a very strong signal, and the other a very weak signal, then this ratio will adopt very high values which make the angular response curve of the sensor according to the invention very non-linear. This is illustrated by the curve CRφ of FIG. 2. This Figure illustrates, on the abscissa, the angle of incidence $\theta$ as defined on FIG. 1C for an incident radiation φ.

Figure 2:
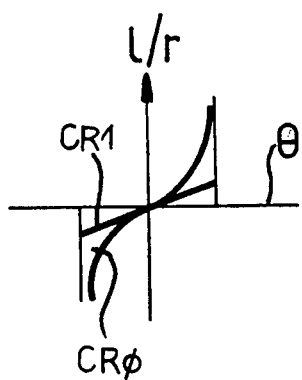
FIG. 2 is a graph enabling a better understanding of the invention to be obtained.

With a gap EM as described above, it has proved to be possible to linearize the response of the photodetector as can be seen on the far more rectilinear curve appearing at CR1 in FIG. 2.

Figure 3C:
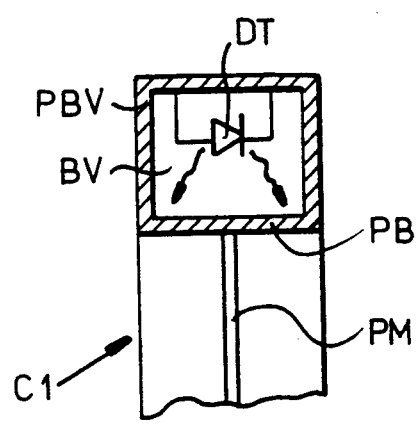
FIG. 3C illustrates an expedient variant of the invention.

FIG. 3C shows how it is possible to test the response of the device with a diode specifically provided for this purpose.

At the top of the device is a block of glass BV having opaque external walls PBV and accommodating a light-emitting diode DT. This block of glass communicates with the two halves of the body C1 (on either side of the metallized plane PM) via two orifices provided in the metallized plane PB. In this manner a single reference light source is available to establish and to check the calibration of each sensor of the device.

Reference is now made to FIGS. 4A to 4C.

Instead of sensing the signals received in the two parts of the body by optical fibers which then pass to photodetectors it is expedient, for the implementation of the invention, to mount photodetectors directly at the end of the extension ET (or of the bend CM).

FIGS. 4A–4C illustrate a support SD, on which are mounted various photodetectors within a cylindrical screen E capable of accommodating the lower part of the extension ET, which is provided with the metallized plane PM which traverses it totally (like the part ML, which is itself also provided with an external metallization).

In the enlarged sectional view of FIG. 4A, it is possible to observe two small diodes D1L and D1R situated to the left and to the right respectively of the part PME of the metallized plane PM which is situated at the location of the extension ET. These diodes, which are close to the axis of revolution of the body (or of the bend), have a first type of response to the incident light. On the remainder of the available surface are placed two diodes or arrays of diodes D2L and D2R, which have a second type of response to the light. A screen separates and decouples the left-hand diodes from the right-hand ones.

Advantageously, the response of the diodes of the type D1 is the following: rapid response to light radiation; low sensitivity. Conversely, the diodes D2 have a higher sensitivity (a larger quantity of energy sensed) but a slower response.

The aim is to permit a rapid detection of certain incident types of laser radiation, such as rangefinding lasers. The pulses concerned are generally short, appearing in one or more narrow bands known in advance, and possess a high energy. It will certainly be possible to provide a plurality of diodes of the type D1 operating in two different sub-bands.

On the other hand, the function of the diodes of the type D2 is to ensure a monitoring of high sensitivity on incident laser radiations having a lower energy than the foregoing ones, such as lasers associated with systems for the designation of targets ("tracking").

FIG. 5 shows how it is possible to process the signals obtained in this matter.

In the top part, the radiations emanating from the diodes D1R and D1L are respectively applied to regulable logarithmic amplifiers AL1 and AL2, followed by delay lines LL1 and LL2, and then by analogue-digital encoders CAN1 and CAN2. The two outputs of the amplifiers AL1 and AL2 are likewise applied to an integrating amplifier AS, which detects the presence of pulses on the entire sensor (for the diodes D1) and consequently controls the triggering of the two encoders for the digital sampling of the signals sensed. The delays (a few nanoseconds) allow the encoder operating time.

The outputs of the two converters CAN1 and CAN2 and of the amplifier AS are applied to second processing means MT2, the function of which is to form the ratio between the radiations received on the right and on the left in the sensor and to infer therefrom the angular direction of arrival of the laser pulses, as will be understood by a person skilled in the art, from what has already been described in the aforementioned applications for a French Patent and Certificate of Addition.

The diodes D2R and D2L form the subject of a similar processing in a circuit MTB, the structure of which is the same as the circuit MTA. However, the circuit MTB exhibits, in principle, a narrower pass band and a higher gain. These outputs are likewise transmitted to the processing means MT2.

Proceeding from here, the processing mean MT2 control alarm visual display means MV, which are fed from the on-board power supply of the vehicle and may exhibit an output for audible signals to the on-board "radio" circuits.

Advantageously, the processing means, MT2 are likewise connected to the on-board central computer by a bus such as those in the format referred to as DIGI-BUS or 1553, which are available from Electronique Serge Dassault of Paris, France.

Figure 6:
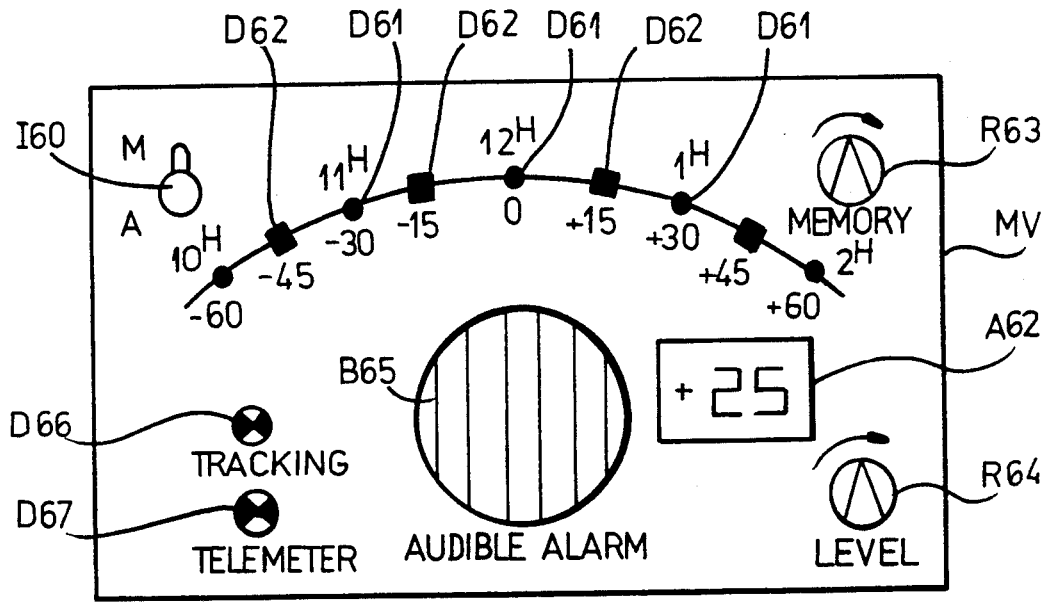
FIG. 6 is an example of a visual display which can be used in a detector according to the invention.

FIG. 6 shows an advantageous embodiment of a visual display device.

First of all, a start/stop switch 160 is provided.

The main visual display is supplied by diodes D61 and D62 which are advantageously of different colors (expressed in substantive terms by different shapes in the Figure). These diodes are distributed over a circular arc starting from a median position at O, and to indicate angles going as far as 60° on either side of the O. It is expedient to provide a corresponding visual display by reference to the dial of a watch, in the way in which this is traditional for the definition of a bearing in certain applications.

The angular visual display obtained in this manner, which is unsophisticated but immediately readable, is from the outset far more precise than that which could have been produced up to the present time on board a vehicle with the conventional means. It may, of course, be supplemented by a more precise visual display of angle, on a digital display unit A62.

A loudspeaker B65 permits an audible alarm, while two further diodes D66 and D67 permit the indication either of the imminence of a danger ("tracking") or of the existence of a system which is in the process of observing the vehicle ("telemeter").

The display advantageously comprises buttons R63 and R64 for the setting of the storage time of the display of the acoustic level.

Figure 7:
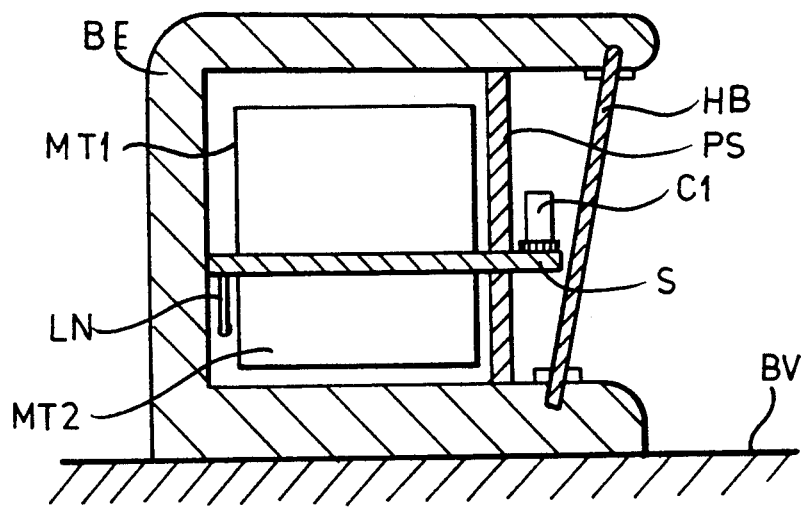
FIG. 7 is a particular embodiment of a detector according to the invention, which detector is enclosed within an armoured casing situated outside a vehicle.

FIG. 7 shows an example of the mounting of a device according to the invention on a vehicle which may be a tank and the chassis of which can be seen at BV.

On this chassis BV is mounted an armoured casing BE which has an open face closed by an inclined shield HB. Behind this shield, which is transparent to the radiations to be observed, the sensor C1 according to the invention is mounted on a horizontal support S. The support S traverses an intermediate wall PS beyond which it receives, at the upper part, the first processing means MT1 and, in the lower part, the second processing means MT2, these being connected by a digital link LN to the display mounted within the vehicle.

Constraints of power and of price and/or space mean that the lasers which are employed in practice operate at well-established discrete wavelengths (for example ruby lasers or alternatively YAG- neodymium lasers). It is then expedient to provide, behind the shield HB, an optical comb interferometric filter which transmits only these discrete wavelengths. In this way, using a single filter, the noise induced by the ambient light in all the photodetectors is reduced. The use of a single filter eliminates any requirement to match different filters.

The present invention is, of course, not limited to the described embodiment, but, on the contrary, extends to any variant in accordance with the claims set forth hereinbelow.

We claim:

1. In a detector of pulses of electromagnetic radiation, for use with photodetector means, comprising sensing means which include at least one body of revolution having first and second ends and formed of material which is transparent to, and spatially diffusing for, the electromagnetic radiation, said body of revolution having a capture window on its surface of revolution and being provided with an internal metallization delimiting on the body of revolution two parts subject to selective photodetection in order to obtain a sensitivity in bearing and/or in elevation, the improvement comprising a non-diffusing transparent part of said body extending it at said first end, said non-diffusing transparent part being traversed by said internal metallization and being externally metallized for serving as a link with said photodetector means.

2. A detector according to claim 1, wherein said body of revolution is a cylinder.

3. A detector according to claim 1, wherein said electromagnetic radiation consists of laser pulses.

4. A detector according to claim 1, wherein said non-diffusing transparent part comprises an optical bend.

5. A detector according to claim 1, wherein said photodetector means comprises at least one photoelectric transducer mounted directly on a free end of the said non-diffusing transparent part on each side of the metallization.

6. A detector according to claim 5, wherein said photodetector means comprises first and second photodetector means of which said first photodetector means has a more rapid response than the second and the second is more sensitive than the first, said first and second photodetector means each being mounted on both sides of the internal metallization.

7. A detector according to claim 6, wherein said internal metallization is planar, and said first photodetector means are mounted on a small surface close to the longitudinal axis of said non-diffusing transparent part, while the second photodetector means cover the major part of the remainder of the surface available at the free end of said non-diffusing transparent part on both sides of the planar internal metallization.

8. A detector according to claim 1, wherein at the location of the capture window the internal metallization ceases on one side at a distance from the surface of said body of revolution, which provides a partial common mode reducing the ratio of the optical powers received in the two parts of the body of revolution and permitting the linearization of the response of the detector.

9. A detector according to claim 6, wherein at the location of the capture window the internal metallization ceases on one side at a distance from the surface of said body of revolution, which provides a partial common mode reducing a ratio of optical powers received in the two parts of the body of revolution and permitting the linearization of the response of the detector.

10. A detector according to claim 9, including for said first and second photodetector means, respective first processing means comprising:

first and second logarithmic amplifiers receiving the signals emanating from said two sides of the internal metallization respectively;

an integrating amplifier for amplifying the outputs of said first and second logarithmic amplifiers;

first and second delay elements, connected to the outputs of said first and second logarithmic amplifiers respectively, and first and second analogue-to-digital encoders respectively connected to the outputs of said first and second delay elements and triggered as a function of the output of said integrating amplifier.

11. A detector according to claim 10, and further including second processing means receiving the outputs of said first and second analogue-to-digital encoders and of the integrating amplifier to determine the ratio of the optical powers received in the body on the two sides of said internal metallization thereof.

12. A detector according to claim 11, including bus means connected to an on-board central computer, and means connecting said second processing means to said bus means.

13. A detector according to claim 12, wherein said bus means is one of the group comprising a bus bar and a system known by the Trade Mark DIGIBUS.

14. A detector according to claim 1, comprising visual display means in the form of (a) a row of photodiodes in a circular arc representing angular sectors about a reference value, (b) a digital display of a finer angular measurement, and (c) an indication of the type of incident signal received by the photodetectors; and audible alarm means.

15. A detector according to claim 1, further comprising a casing receiving said body of revolution and which is armoured everywhere except on a sensitive side of the body of the revolution where it is provided with an inclined shield.

16. A detector according to claim 15, wherein said inclined shield is provided with an optical comb filter limiting transmission of said inclined shield to discrete wavelength bands.

17. A detector according to claim 1, and further comprising a light-emitting diode capable of applying, on command, a reference radiation to the two sides of the internal metallization of the body of revolution.

* * * * *